United States Patent
Kluwe et al.

(10) Patent No.: US 8,055,114 B2
(45) Date of Patent: Nov. 8, 2011

(54) CABLE SLEEVE FOR THE STRUCTURED STORAGE AND HANDLING OF OPTICAL WAVEGUIDES GUIDED IN OPTICAL WAVEGUIDE CABLES

(75) Inventors: Wolf Kluwe, Iserlohn (DE); Roman Arnold Theodor Syplacz, Hagen (DE); Thorsten Müller, Menden (DE)

(73) Assignee: CCS Technology, Inc., Wilmington, DE (US)

( * ) Notice: Subject to any disclaimer, the term of this patent is extended or adjusted under 35 U.S.C. 154(b) by 428 days.

(21) Appl. No.: 12/323,530

(22) Filed: Nov. 26, 2008

(65) Prior Publication Data
US 2009/0103876 A1    Apr. 23, 2009

Related U.S. Application Data

(63) Continuation of application No. PCT/EP2007/004478, filed on May 19, 2007.

(30) Foreign Application Priority Data

May 30, 2006    (DE) ............... 20 2006 008 654 U

(51) Int. Cl.
*G02B 6/00* (2006.01)
(52) U.S. Cl. .......... 385/134; 385/136; 385/139
(58) Field of Classification Search ............ 385/134, 385/136–139
See application file for complete search history.

(56) References Cited

U.S. PATENT DOCUMENTS

| | | | |
|---|---|---|---|
| 3,848,074 A | 11/1974 | Channell | 174/38 |
| 5,055,636 A | 10/1991 | Jaycox | 174/87 |
| 5,097,529 A | 3/1992 | Cobb et al. | 385/135 |
| 5,446,823 A | 8/1995 | Bingham et al. | 385/135 |
| 5,455,391 A | 10/1995 | Demesmaeker et al. | 174/93 |
| 5,479,554 A | 12/1995 | Roberts | 385/135 |
| 5,553,186 A | 9/1996 | Allen | 385/135 |
| 5,556,060 A | 9/1996 | Bingham et al. | 248/49 |
| 5,598,499 A | 1/1997 | Burek et al. | 385/138 |
| 5,652,820 A | 7/1997 | Glaser et al. | 385/135 |
| 5,758,004 A | 5/1998 | Alarcon et al. | 385/135 |
| 5,764,844 A | 6/1998 | Mendes | 385/135 |
| 5,774,618 A | 6/1998 | Jones | 385/135 |
| 5,775,702 A | 7/1998 | Laeremans et al. | 277/314 |
| 5,793,920 A | 8/1998 | Wilkins et al. | 385/135 |

(Continued)

FOREIGN PATENT DOCUMENTS

DE    3726718 A1    2/1989

(Continued)

*Primary Examiner* — Ellen Kim
(74) *Attorney, Agent, or Firm* — Christopher Paul Lewallen

(57) ABSTRACT

A cable sleeve for the structured storage and handling of optical waveguides guided in optical waveguide cables is disclosed. The cable sleeve comprises a covering body, which defines an interior. The cable sleeve also comprises a sealing body comprising two dimensionally stable end pieces and a compressible gel element arranged between the end pieces. The sealing body is adapted to be inserted into an opening of the covering body and is operable for feeding optical waveguide cables into the interior and/or for feeding optical waveguide cables out of the interior. The sealing body bears against a stop with an inner one of the two dimensionally stable end pieces. A locking body can be screwed to an outer one of the two dimensionally stable end pieces of the sealing body while compressing the gel element. At least one compensation element is operable for storing the force applied via the locking body and exerting a compression force onto the gel element.

9 Claims, 3 Drawing Sheets

U.S. PATENT DOCUMENTS

| | | | |
|---|---|---|---|
| 6,052,504 A | 4/2000 | Fröhlich et al. | 385/134 |
| 6,292,614 B1 | 9/2001 | Smith et al. | 385/135 |
| 6,315,461 B1 * | 11/2001 | Cairns | 385/56 |
| 6,344,615 B1 | 2/2002 | Nolf et al. | 174/92 |
| 6,411,767 B1 | 6/2002 | Burrous et al. | 385/135 |
| 6,533,472 B1 | 3/2003 | Dinh et al. | 385/95 |
| 6,628,880 B2 | 9/2003 | Roberts | 385/135 |
| 6,721,483 B2 * | 4/2004 | Grubish et al. | 385/135 |
| 6,802,512 B2 | 10/2004 | Muller et al. | 277/607 |
| 6,856,747 B2 | 2/2005 | Cloud et al. | 385/135 |
| 7,045,710 B1 | 5/2006 | Allen et al. | 174/50 |
| 7,308,183 B2 | 12/2007 | Kowalczyk et al. | 385/135 |
| 7,330,628 B1 | 2/2008 | Kowalczyk et al. | 385/135 |
| 2001/0022886 A1 * | 9/2001 | Cairns et al. | 385/138 |
| 2007/0003206 A1 * | 1/2007 | Dunphy et al. | 385/138 |
| 2010/0061686 A1 | 3/2010 | Hetzer et al. | 385/100 |
| 2010/0061687 A1 | 3/2010 | Hetzer et al. | 385/100 |
| 2010/0061692 A1 | 3/2010 | Hetzer et al. | 385/135 |

FOREIGN PATENT DOCUMENTS

| | | |
|---|---|---|
| DE | 3726719 A1 | 2/1989 |
| DE | 4231181 C1 | 8/1993 |
| DE | 19728370 | 1/1999 |
| DE | 19954884 | 6/2000 |
| DE | 10010452 | 6/2001 |
| DE | 10338848 A1 | 3/2005 |
| DE | 202005009932 | 12/2005 |
| DE | 202005014677 | 12/2005 |
| EP | 0693699 B1 | 1/1996 |
| EP | 0646294 | 11/1996 |
| EP | 0841734 | 5/1998 |
| FR | 2748867 | 11/1997 |
| WO | WO92/22113 | 12/1992 |
| WO | WO92/22114 | 12/1992 |
| WO | WO93/26069 | 12/1993 |
| WO | WO93/26070 | 12/1993 |
| WO | WO96/30794 | 10/1996 |
| WO | WO96/32660 | 10/1996 |
| WO | WO97/12268 | 4/1997 |
| WO | WO98/08125 | 2/1998 |
| WO | WO99/33154 | 7/1999 |
| WO | WO99/49548 | 9/1999 |
| WO | WO99/56370 | 11/1999 |

* cited by examiner

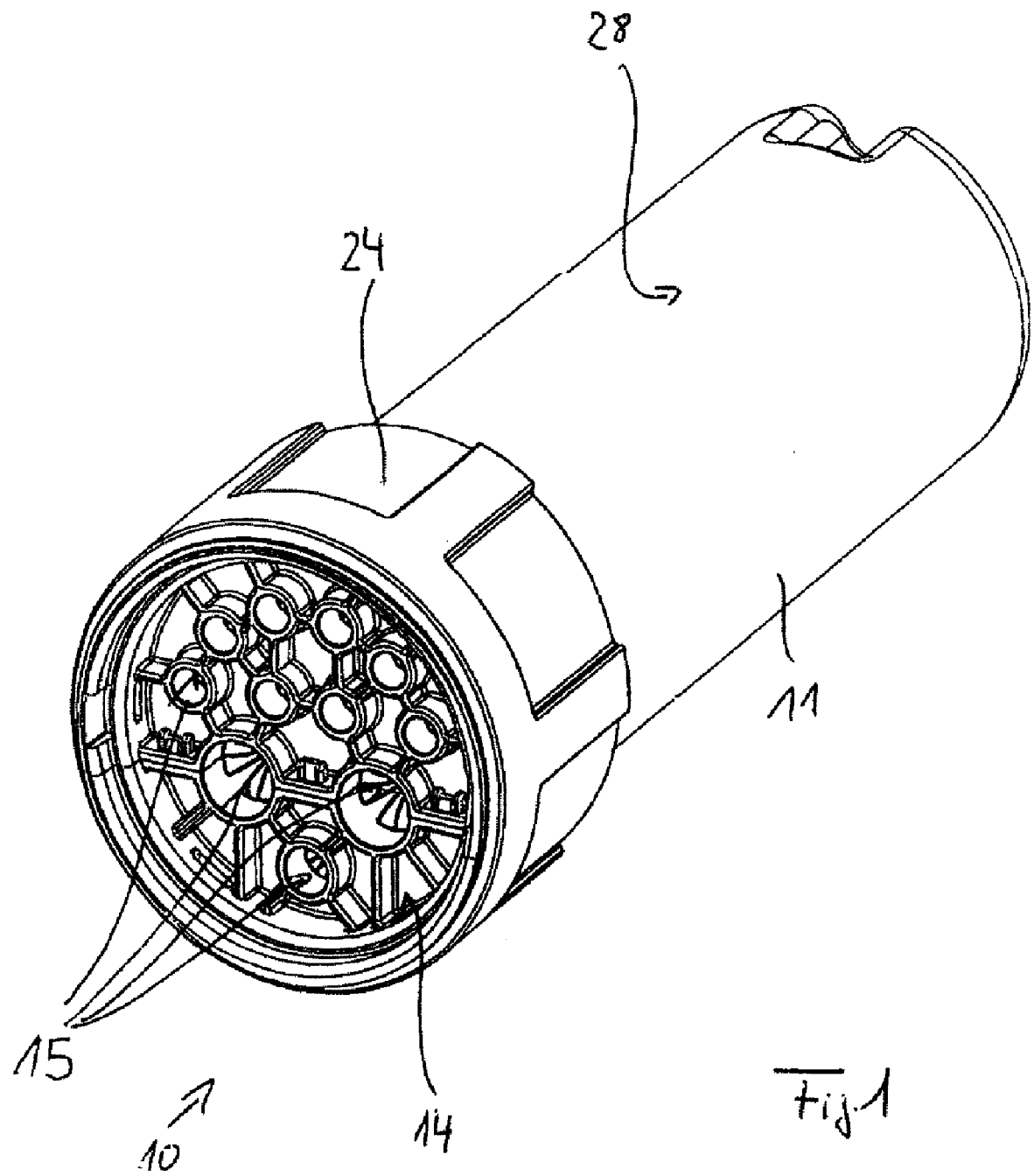

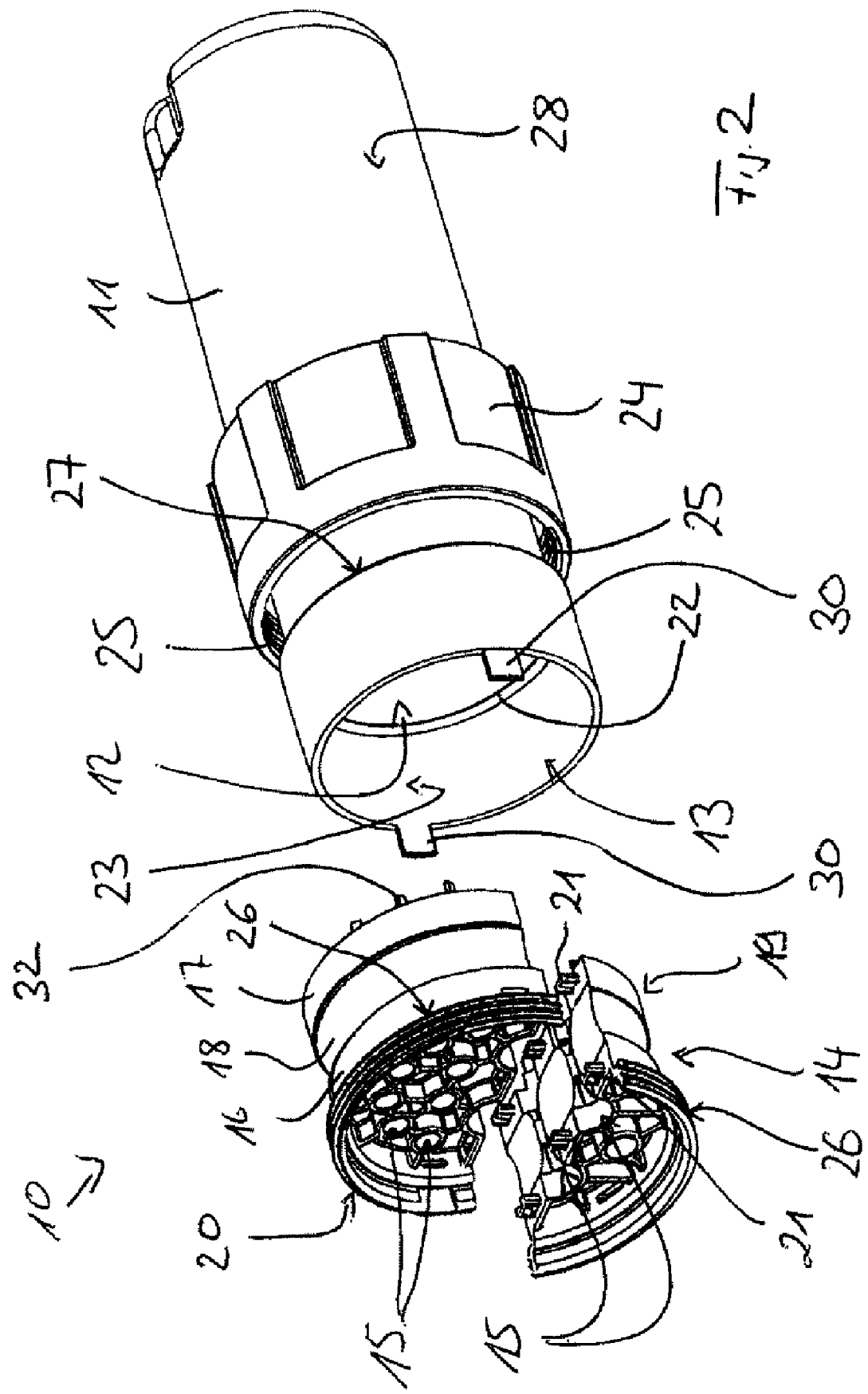

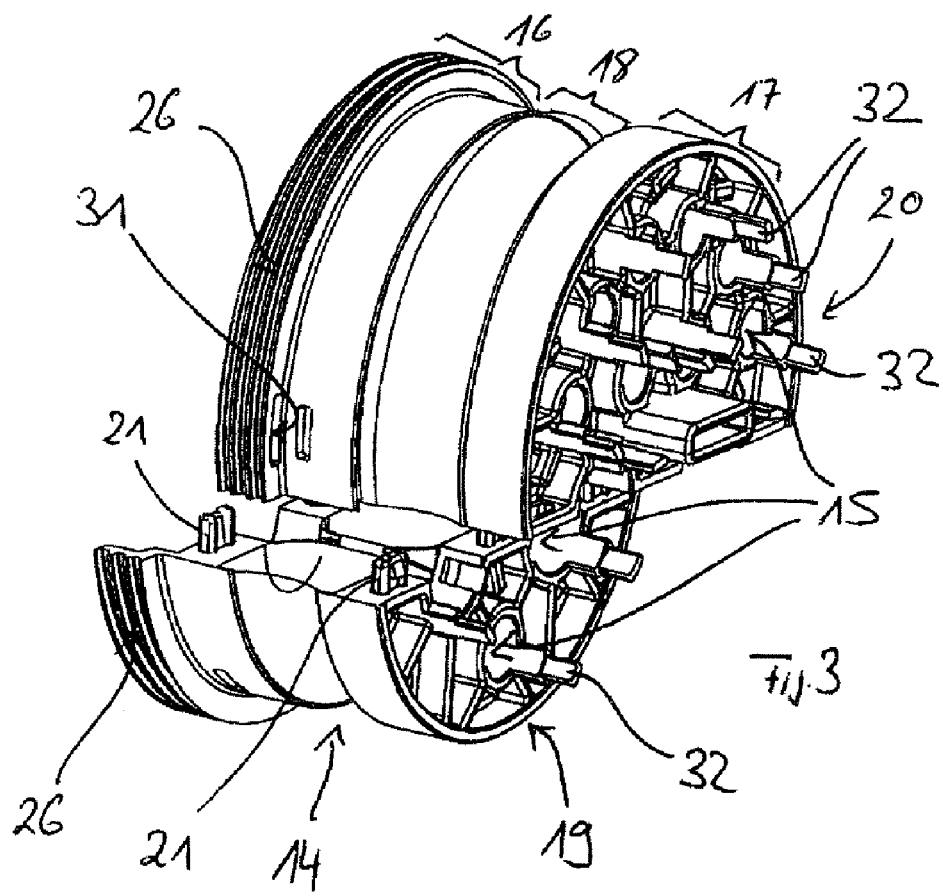
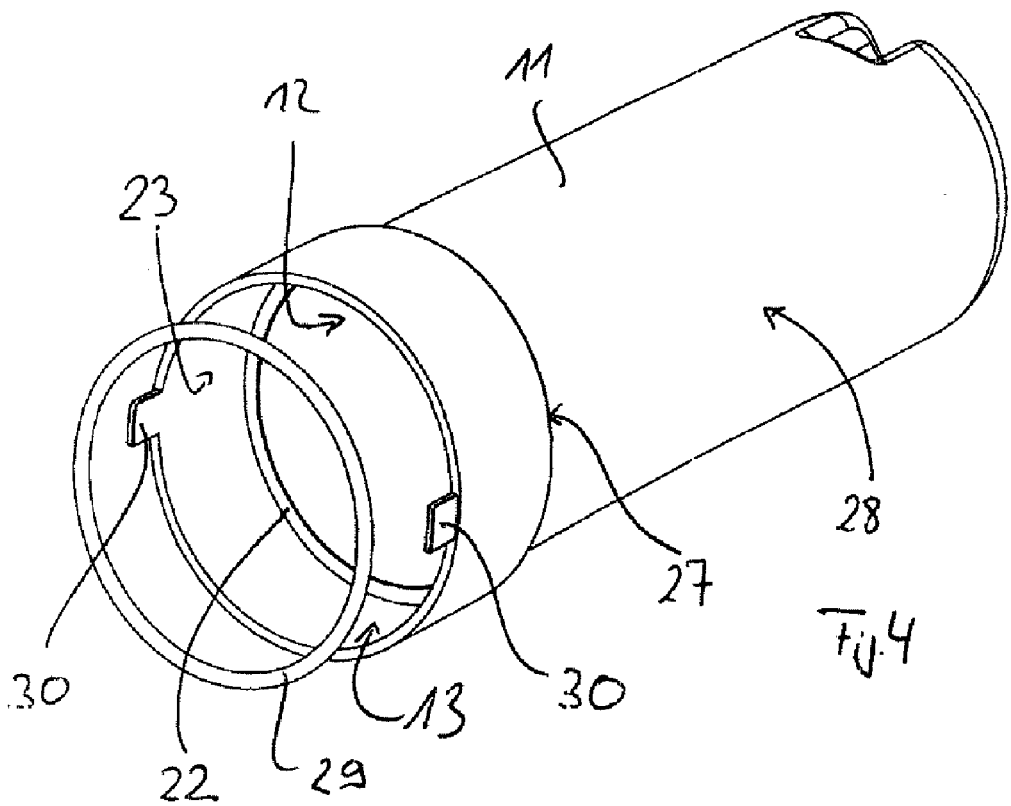

CABLE SLEEVE FOR THE STRUCTURED STORAGE AND HANDLING OF OPTICAL WAVEGUIDES GUIDED IN OPTICAL WAVEGUIDE CABLES

CROSS-REFERENCE TO RELATED APPLICATIONS

This application is a continuation of International Application No. PCT/EP2007/004478, filed May 19, 2007, which claims priority to German Application No. DE202006008654.4, filed May 30, 2006, both applications being incorporated herein by reference.

BACKGROUND

1. Technical Field

The invention relates to a cable sleeve for the structured storage and handling of optical waveguides guided in optical waveguide cables.

2. Technical Background

Cable sleeves for the structured storage and handling of optical waveguides guided in optical waveguide cables are used in optical waveguide cable networks for protecting spliced connections at connecting points of two optical waveguide cables and for protecting the optical waveguide at branch-off points or at dividing points of optical waveguide cables. In doing so, the cable sleeves must guarantee the continuity of the optical waveguide cables as if the optical waveguide cables were not interrupted. Great importance is attached here to the structured storage and gentle handling of the optical waveguides so that the transmission characteristics of the optical waveguides are not negatively affected.

A cable sleeve is disclosed in EP 0 646 294 B1. The cable sleeve disclosed there comprises a covering body and a sealing body that can be fed into an opening of the covering body, the sealing body comprising a gel-like sealing material, which is arranged between two dimensionally stable plates. According to EP 0 646 294 B1, the sealing body can be slid in and out in a hollow cavity in the axial direction with respect to the covering body in order to compensate for pressure differences between an internal pressure and an external pressure of the cable sleeve. In doing so, the sealing body comes to bear against different stops depending on this pressure difference.

A further cable sleeve is disclosed in U.S. Pat. No. 5,455,391, which likewise comprises a sealing body, which comprises two dimensionally stable end pieces and a compressible gel element arranged between the two end pieces. According to U.S. Pat. No. 5,455,391, the gel element is pierced by clamping elements, which press the two dimensionally stable end pieces against one another.

SUMMARY

According to one aspect, a cable sleeve for the structured storage and handling of optical waveguides guided in optical waveguide cables. A covering body has a stop against which the sealing body bears with an inner dimensionally stable end piece, wherein a locking body can be screwed to an outer dimensionally stable end piece of the sealing body while compressing the gel element, and whereby at least one compensation element stores the force applied via the locking body and exerts a compression force onto the gel element.

Optical waveguide cables to be fed into the cable sleeve or removed therefrom can be easily sealed. The sealing results from compressing the gel element and the or each compensation element. The or each compensation element provides a compression force for the gel element in order to guarantee a good sealing effect of the gel element even in the event of a change in the behavior thereof due to temperature. The or each compensation element stores the force applied via the locking body when locking the cable sleeve and subjects the gel element of the sealing body to the compression force.

The or each compensation element may be designed in the form of an elastomer ring, which is arranged between the inner end piece of the sealing body and the stop formed by the covering body.

The locking body has an internal thread by means of which said locking body is screwed to an external thread associated with the outer end piece of the sealing body.

BRIEF DESCRIPTION OF THE FIGURES

An exemplary embodiments of the invention, without being restricted thereto, are described in more detail with reference to the drawing. In the drawings:

FIG. 1 shows a cable sleeve according to an exemplary embodiment for the structured storage and handling of optical waveguides guided in optical waveguide cables designed in the form of a hood sleeve in perspective view, FIG. 2 shows the cable sleeve according to the embodiment as shown in FIG. 1 in perspective exploded view, FIG. 3 shows a sealing body of the cable sleeve according to the embodiment as shown in FIGS. 1 and 2 in perspective exploded view, and FIG. 4 shows a covering hood of the cable sleeve according to the embodiment as shown in FIGS. 1 and 2 together with a compensation element of the cable sleeve in perspective view.

DETAILED DESCRIPTION

Referring now to FIGS. 1 to 4, a cable sleeve for the structured storage and handling of optical waveguides guided in optical waveguide cables designed in the form of a hood sleeve is shown. The cable sleeve may be used with hood sleeves, and may also be used with any other types of sleeve, for example, without limitation, with so-called in-line sleeves.

FIG. 1 shows a cable sleeve 10 in the assembled state. An exploded view of the cable sleeve shown in FIG. 1 can be seen in FIG. 2. The cable sleeve 10 of FIGS. 1 and 2 is designed in the form of a hood sleeve and has a covering body 11 designed in the form of a covering hood, which according to FIG. 2 defines an interior 12 of the cable sleeve 10. A sealing body 14 can be inserted into an opening 13 of the covering body 11, wherein on the one hand optical waveguide cables can be fed into the interior 12 of the cable sleeve 10 and on the other hand the optical waveguide cables can be fed out of the interior 12 via the sealing body 14. The optical waveguide cables are fed into and out of the interior 12 of the cable sleeve 10 by means of openings 15 integrated in the sealing body 14. The sealing body 14 of the cable sleeve 10 is shown by itself in FIG. 3, namely in an exploded view.

The sealing body 14 of the cable sleeve 10 according to the invention has two dimensionally stable end pieces 16 and 17, between which is arranged a compressible gel element 18. As can be seen from FIGS. 2 and 3, the sealing body 14 is designed in two parts and is accordingly made up of two halves 19 and 20. In the assembled state of the cable sleeve 10, the separation plane of the sealing body 14 hereby runs in the longitudinal direction of the cable sleeve 10 or in the longitudinal direction of the covering body 11. According to FIGS. 2 and 3, one of the two halves 19 of the sealing body 14 has projections 21 designed in the form of snap-in hooks, which engage in recesses (not shown) of the other half 20 of the sealing body 14 in the assembled state of the sealing body 14 and thus hold the two halves 19, 20 of the sealing body 14 together.

The covering body 11 of the cable sleeve 10 according to the invention has a stop 22, which is formed by a step-like change in cross section of an inner wall 23 of the covering body 11.

The stop 22 restricts the insertion depth of the sealing body 14 into the interior 12 of the covering body 11, wherein, when the sealing body 14 bears against the stop 22 with the inner dimensionally stable end piece 17 in an uncompressed state, the sealing body 17 stands at least partially around the covering body 11 with the outer dimensionally stable end piece 16, or protrudes at least partially therefrom.

A locking body 24 of the cable sleeve 10 can be screwed to the outer dimensionally stable end piece 16 of the sealing body 14 while compressing the gel element 18, namely in such a way that the screwing action causes the outer dimensionally stable end piece 16 to be pushed against the inner end piece 17 which bears against the stop 22. As can be seen from FIG. 2, the locking body 24 has an internal thread 25 for this purpose, by means of which the locking body 24 can be screwed to an external thread 26 associated with the outer dimensionally stable end piece 16 of the sealing body 14.

The locking body 24 is designed in the form of a sleeve nut so to speak, the relative movement of which with respect to the covering body 11 is limited by a stop 27, which is formed by a step-like change in cross section of an outer wall 28 of the covering body 11.

Furthermore, the cable sleeve 10 according to the invention has at least one compensation element 29, by means of which the force for compressing the gel element 18 of the sealing body 14 and which is applied with the help of the locking body 24 can be stored. In the exemplary embodiment shown, the cable sleeve 10 according to the invention has a single compensation element 29, which is designed in the form of an elastomer ring. In the assembled state of the cable sleeve 10, the compensation element 29, which is designed in the form of an elastomer ring, is arranged between the inner dimensionally stable end piece 17 of the sealing body 14 and the stop 22 for the sealing body 14 formed by the covering body 11.

As already mentioned, the compensation element 29 stores the force which is applied with the help of the locking body 24 and exerts a compression force 18 on the sealing body 24 or the gel element 18 thereof. This enables a change in the behavior of the gel element 18 of the sealing body 14 due to temperature to be balanced or compensated for and thus a good sealing action of the sealing element 14 to be guaranteed over a wide temperature range.

According to FIG. 2, the fitted position of the sealing body 14 in the covering body 11 is defined by projections 30, which are associated with the covering body 11 and which can be inserted into slot-like recesses 31 of the sealing body 14 (see FIG. 3). According to FIGS. 2 and 4, in the exemplary embodiment two diametrically opposed projections 30 are associated with the covering body 11, wherein each of the projections 30 can be inserted into a slot-like recess 31 of the sealing body 14. At the same time, the slot-like recesses 31 are associated with the outer dimensionally stable end piece 16 of the sealing body 14.

When the cable sleeve 10 is assembled or put together, the sealing body 14 is accordingly inserted into the opening 13 of the covering body 11, wherein the stop 22 of the covering body 11 limits the insertion depth of the sealing body 14 into the covering body 11. When the sealing body 14 bears with the inner end piece against the stop 22 in an uncompressed state, said sealing body then stands around the covering body 11 at least with the external thread 26 of the outer dimensionally stable end piece 16, or protrudes at least partially therefrom. The locking body 24, which is designed in the form of a sleeve nut, is screwed by means of its internal thread 25 to the external thread 26 of the sealing body 14, wherein in this case the gel element 18 of the sealing body 14 is compressed due to the fact that the sealing body 14 bears with the inner end piece 17 against the stop 22.

At the same time, the compensation element 29, which stores the force applied via the locking body 24 to lock the cable sleeve 10, is also compressed and holds the gel element 18 of the sealing body 14 under compression force. This enables a change in the behavior of the gel element 18 due to temperature to be balanced or compensated for.

Preferably, the compensation element 29 is formed from a thermoplastic elastomer, referred to as TPE for short. In particular, thermoplastic polyurethane, TPU or PUR for short, is suitable for the thermoplastic elastomer. Likewise, it is possible to manufacture the compensation element 29 from a terpolymer elastomer, for example from ethylene propylene rubber, referred to as EPM for short, or from ethylene propylene diene rubber, referred to as EPDM for short. It is also possible to embody the compensation element 29 from a silicone elastomer.

The locking body 24 is designed to be open at both ends so that said locking body can be slid relative to the covering body 11 in the manner of a sleeve nut. The openings 15 of the sealing body 14, which are used for feeding optical waveguide cables into and out of the cable sleeve 10, are accordingly not covered by the locking body 24.

A further special feature of the cable sleeve 10 according to the invention can be seen in that, next to the openings 15, which are used for feeding optical waveguide cables into and out of the interior 12 of the cable sleeve 10, the inner dimensionally stable end piece 17 of the sealing body 14 has bar-like projections 32, which form integral stress relief elements for the optical waveguide cables.

What is claimed is:

1. A cable sleeve for the structured storage and handling of optical waveguides guided in optical waveguide cables, comprising:
   a covering body, which defines an interior;
   a sealing body comprising two dimensionally stable end pieces and a compressible gel element arranged between the end pieces, wherein the sealing body is adapted to be inserted into an opening of the covering body and operable for feeding optical waveguide cables into the interior and/or for feeding optical waveguide cables out of the interior;
   a stop against which the sealing body bears with an inner one of the two dimensionally stable end pieces, wherein a locking body can be screwed to an outer one of the two dimensionally stable end pieces of the sealing body while compressing the gel element; and
   at least one compensation element operable for storing the force applied via the locking body and exerting a compression force onto the gel element.

2. The cable sleeve of claim 1, wherein the at least one compensation element is designed in the form of an elastomer ring, and wherein the at least one compensation element is arranged between the inner one of the two dimensionally stable end pieces and the stop.

3. The cable sleeve of claim 1, wherein the locking body has an internal thread operable for screwing the locking body to an external thread associated with the outer one of the two dimensionally stable end pieces.

4. The cable sleeve of claim 1, wherein the locking body is designed in the form of a sleeve nut.

5. The cable sleeve of claim 1, wherein the stop is formed by a step-like change in cross section of an inner wall of the covering body, and wherein the stop restricts the insertion depth of the sealing body into the interior.

6. The cable sleeve of claim 1, further comprising at least one projection associated with the covering body and at least one recess associated with the sealing body, wherein an inserted position or fitted position of the sealing body relative to the covering body is determined by the at least one projection and the at least one recess such that when the cable sleeve is assembled the at least one projection engages in a the at least one recess of the covering body.

7. The cable sleeve of claim 1, wherein the sealing body comprises two parts such that a separation plane thereof runs in the longitudinal direction of the cable sleeve.

8. The cable sleeve of claim 7, wherein at least one half of the sealing body has associated with it at least one projection designed in the form of a snap-in hook, which engages in a recess of the respective other half of the sealing body in an assembled state of the sealing body and thus holds the two halves of the sealing body together.

9. The cable sleeve claim 1, wherein the inner one of the dimensionally stable end pieces has projections, wherein the projection form integral stress relief elements for the optical waveguide cables.

* * * * *